United States Patent [19]
Murphy et al.

[11] Patent Number: 5,835,300
[45] Date of Patent: Nov. 10, 1998

[54] DYNAMIC COMPENSATION OF SERVO BURST MEASUREMENT OFFSETS IN A DISC DRIVE

[75] Inventors: Robert Dale Murphy, Yukon; Lealon Ray McKenzie, Edmond; Randall David Hampshire, Agra, all of Okla.

[73] Assignee: Seagate Technology, Inc., Scotts Valley, Calif.

[21] Appl. No.: 791,349

[22] Filed: Jan. 30, 1997

[51] Int. Cl.⁶ .................................................. G11B 5/596
[52] U.S. Cl. .................................... 360/77.05; 360/77.08
[58] Field of Search .................................. 360/27, 77.01, 360/77.02, 77.04, 77.05, 77.06, 77.07, 77.08; 369/44.32

[56] References Cited

U.S. PATENT DOCUMENTS

| | | |
|---|---|---|
| 4,136,365 | 1/1979 | Chick et al. . |
| 4,536,809 | 8/1985 | Sidman . |
| 4,635,141 | 1/1987 | Coulter . |
| 4,679,103 | 7/1987 | Workman . |
| 5,136,439 | 8/1992 | Weispfenning et al. . |
| 5,262,907 | 11/1993 | Duffy et al. . |
| 5,402,280 | 3/1995 | Supino . |
| 5,404,253 | 4/1995 | Painter . |

*Primary Examiner*—Paul W. Huber
*Attorney, Agent, or Firm*—Bill D. McCarthy; Edward P. Heller, III; Randall K. McCarthy

[57] ABSTRACT

Method and apparatus for compensating for errors in the location of servo frames in a disc drive, the servo frames providing control inputs to a servo loop of the disc drive. Each servo frame includes an additional compensation field to which a compensation term is written, the compensation term indicative of the average radial error in the location of the servo frame. The compensation term is determined by measuring the radial distance between adjacent servo frames over a plurality of revolutions of the disc and averaging these measured radial distances. The compensation terms are thereafter used in conjunction with position information from the servo frames to control the position of the head. The compensation term facilitates the elimination of repeatable, random errors in the locations of the servo frames, causing the head to nominally follow a circular path about the disc, regardless of the errors in the locations of the servo frames.

13 Claims, 5 Drawing Sheets

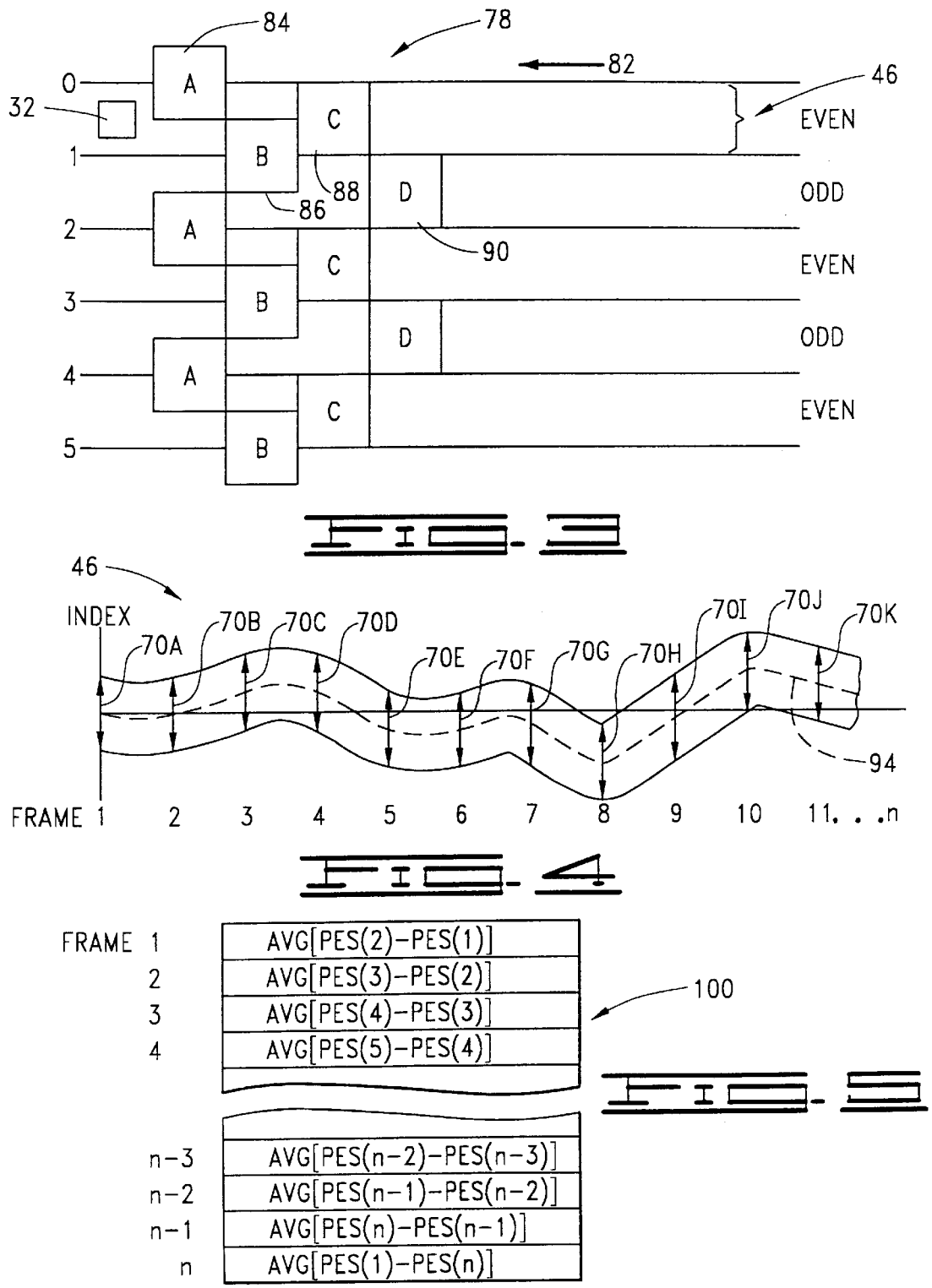

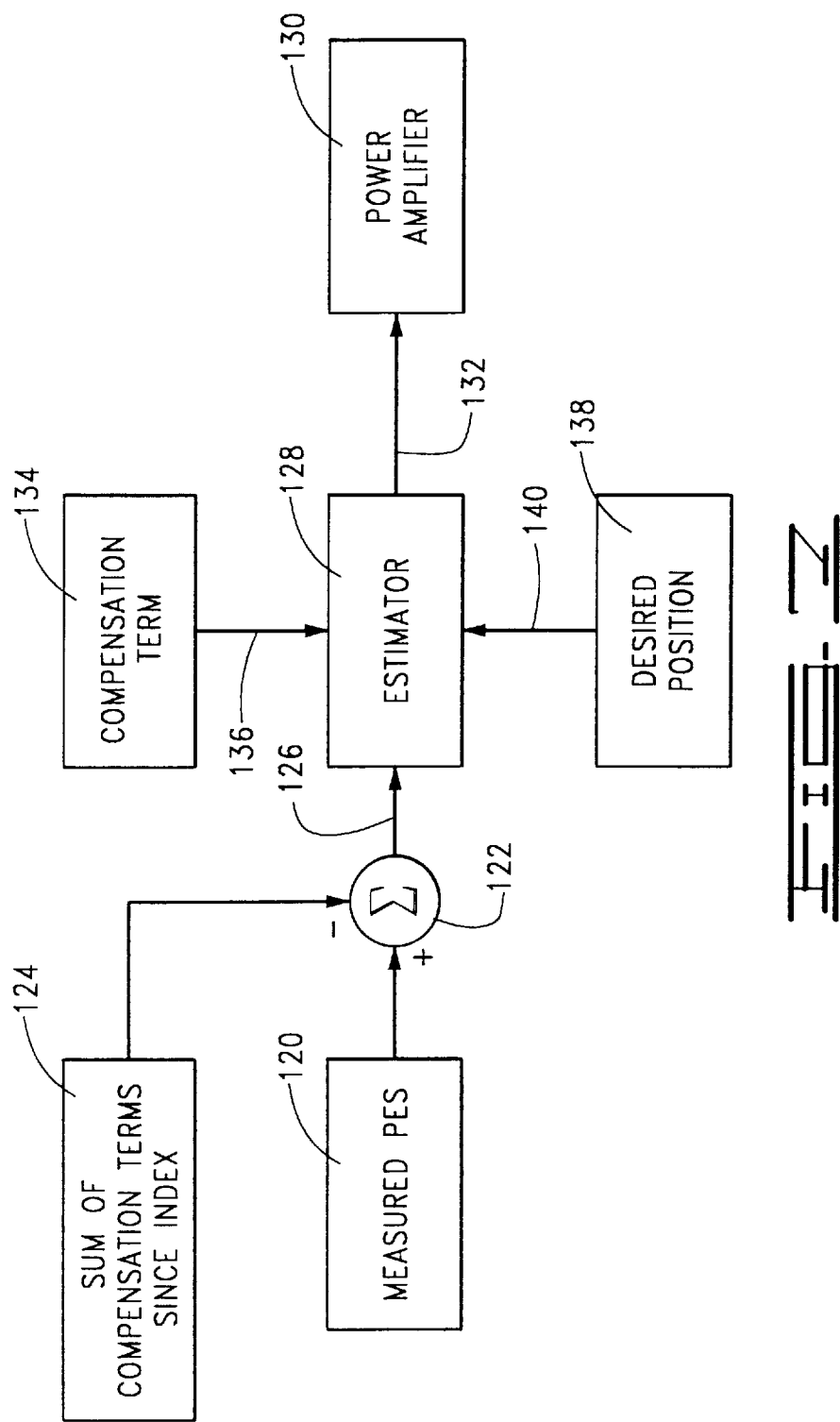

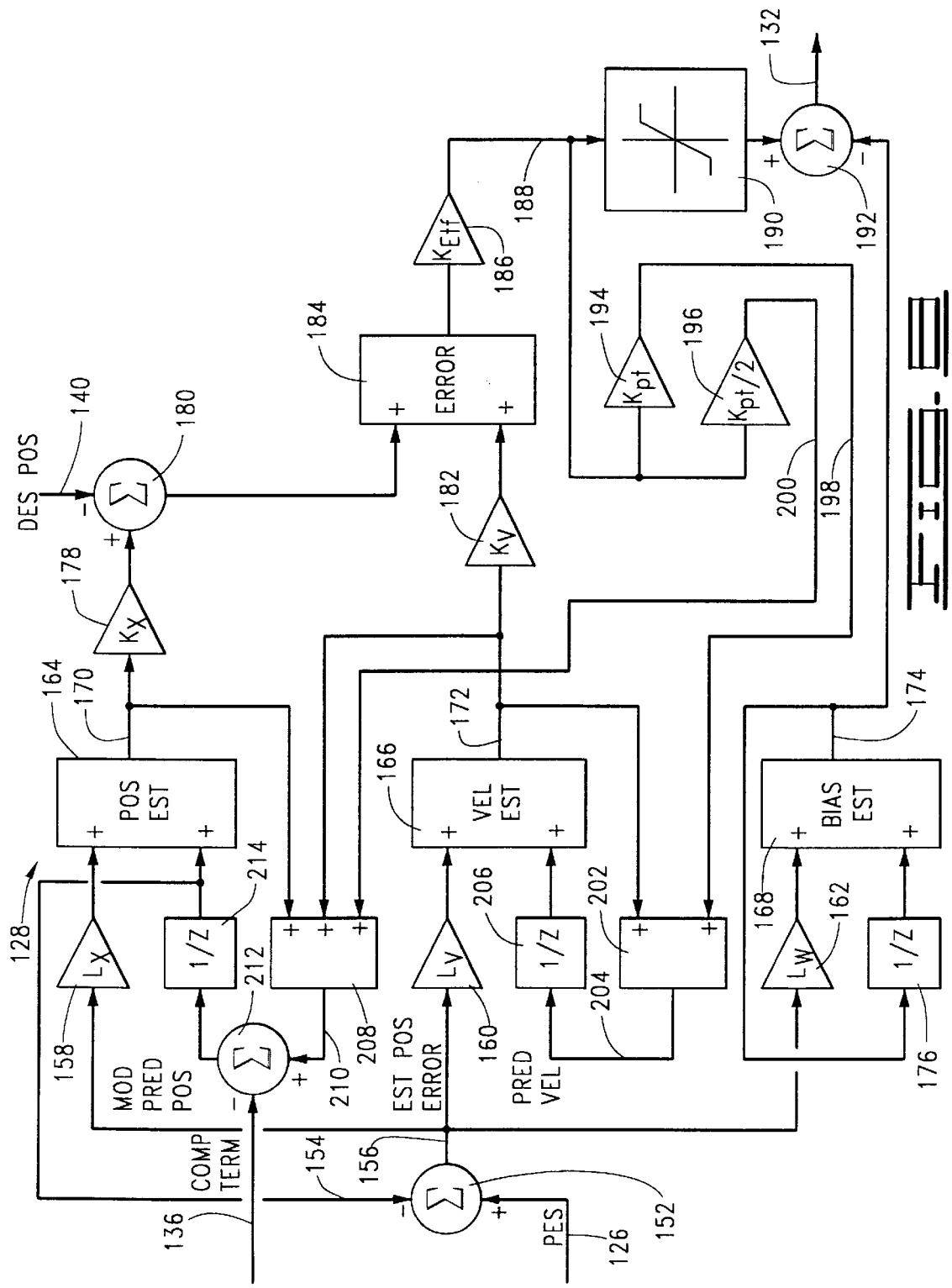

DYNAMIC COMPENSATION OF SERVO BURST MEASUREMENT OFFSETS IN A DISC DRIVE

CROSS-REFERENCE TO RELATED APPLICATIONS

"Not Applicable"

STATEMENT REGARDING FEDERALLY SPONSORED RESEARCH OR DEVELOPMENT

"Not Applicable"

BACKGROUND OF THE INVENTION

This invention relates generally to the field of disc drive data storage devices, and more particularly, but not by way of limitation, to an apparatus and method for compensating for errors in the location of servo information in a disc drive servo system. Modern hard disc drives comprise one or more rigid discs that are coated with a magnetizable medium and mounted on the hub of a spindle motor for rotation at a constant high speed. Information is stored on the discs in a plurality of nominally concentric circular tracks by an array of heads mounted to a radial actuator for movement of the heads relative to the discs. A voice coil motor is used to position the heads with respect to the disc surfaces through the application of current to a coil of the voice coil motor mounted to the actuator.

Control of the position of the heads is typically achieved with a closed loop servo system, an example of which is disclosed in U.S. Pat. No. 5,262,907 entitled HARD DISC DRIVE WITH IMPROVED SERVO SYSTEM, issued to Duffy et al., assigned to the assignee of the present invention and incorporated herein by reference. In such a system, head position (servo) information is prerecorded on at least one surface of the discs. A dedicated servo system entails the use of one entire disc surface for the servo information whereas an embedded servo system interleaves servo information with user data and the servo information is intermittently read by the same heads used to read and write the user data.

A position error signal (PES) is typically generated during a track following mode of operation, the PES indicative of the position of the head with respect to the center of a selected track. Particularly, during track following, the servo system generates the PES from the received servo information and then uses the PES to generate a correction signal which is provided to a power amplifier to control the amount of current through the actuator coil in order to adjust the position of the head accordingly. The servo information includes a series of position fields which are generally offset in a "checkerboard" fashion so that the PES is generated through the manipulation of the relative magnitudes of the read signals provided to the servo system as the position fields are read.

The servo information is written to the discs of a disc drive during the manufacturing process using a highly precise servo track writer. While the tracks defined by the servo information are intended to be perfectly concentric, uncontrolled factors such as bearing tolerances, misalignments of the discs and mechanical resonances of the servo track writing system can lead to errors in the location of the servo information. Thus, the tracks defined by the servo information are not perfectly concentric, but rather exhibit certain random, repeatable variations. Moreover, non-homogeneous media characteristics can result in errors in the effective servo nulls for otherwise properly located servo files. Whereas the effects of such errors in the servo information has in times past had minimal impact upon the operation of the servo loop, as higher track densities are achieved, such errors become increasingly significant. Particularly, such errors can ultimately lead to an upper limit on achievable track densities, as track misalignment budgets must be set large enough to allow the servo loop to compensate for such errors.

Methods to eliminate primary sinusoidal components of such errors have been proposed in the prior art; see, for example U.S. Pat. No. 5,402,280 issued Mar. 25, 1995 to Supino and U.S. Pat. No. 5,404,253 issued Apr. 4, 1995 to Painter. Such methodologies typically include the use of a sine table to generate a sinusoidal correction signal of a selected amplitude and phase which is added to the PES in order to eliminate the primary sinusoidal component of the error.

However, these and other prior art attempts do not compensate for random, non-sinusoidal (or complex sinusoidal) errors in the location of the servo information, but instead are limited to compensating for low harmonic sinusoidal components. There is a need, therefore, for an improved approach to compensating for random errors in the location of servo information in a disc drive.

BRIEF SUMMARY OF THE INVENTION

The present invention comprises a method and apparatus for compensating for errors in the location of servo frames in a disc drive.

In the preferred embodiment, a plurality of servo frames are written to the discs of the disc drive during manufacturing, the servo frames providing control inputs to the disc drive servo loop. A compensation field is additionally provided for each servo frame, with compensation terms being written to the compensation fields during a compensation data routine. Particularly, during the routine the drive causes the head to follow each track having servo frames and measures the error in the location of each servo frame relative to an ideal centerline for each track. The error is accumulated and averaged to generate the compensation terms, which are then written to the compensation fields.

Once the compensation terms are stored, during track following modes of operation, the compensation terms are used as an input to eliminate the effects of the servo frame location errors. Particularly, in the preferred embodiment, the actual PES is measured and summed with the sum of all of the compensation terms for the selected track since the most recent index (that is, beginning reference point for the track) to generate a modified PES. An estimator uses the modified PES, as well as the compensation term for each selected servo frame encountered by the head to generate correction signals which are provided to a power amplifier to position the head. Accordingly, the head is caused to follow an essentially circular path about the center of the disc, regardless of the error in the locations of the servo frames.

An important object of the present invention is to facilitate higher track densities in a disc drive design to accommodate higher storage capacities.

Another object is to compensate for random errors in the location of the servo information.

Still another object is to accommodate higher storage capacities by reducing the amount of servo information required in a disc drive employing embedded servo information.

Other objects, advantages and features of the present invention will be apparent from the following description when read in conjunction with the drawings and appended claims.

BRIEF DESCRIPTION OF THE SEVERAL VIEWS OF THE DRAWINGS

FIG. 3 shows the four position burst fields of the servo frame of FIG. 2.

FIG. 4 provides a representation of the random errors in the location of servo frames for which the present invention compensates.

FIG. 6 provides a general flow diagram for a compensation data routine of the present invention.

FIG. 7 provides a block diagram of a portion of the servo loop of FIG. 1.

FIG. 8 provides a block diagram of an estimator shown of FIG. 7.

DETAILED DESCRIPTION OF THE INVENTION

Figure 1:
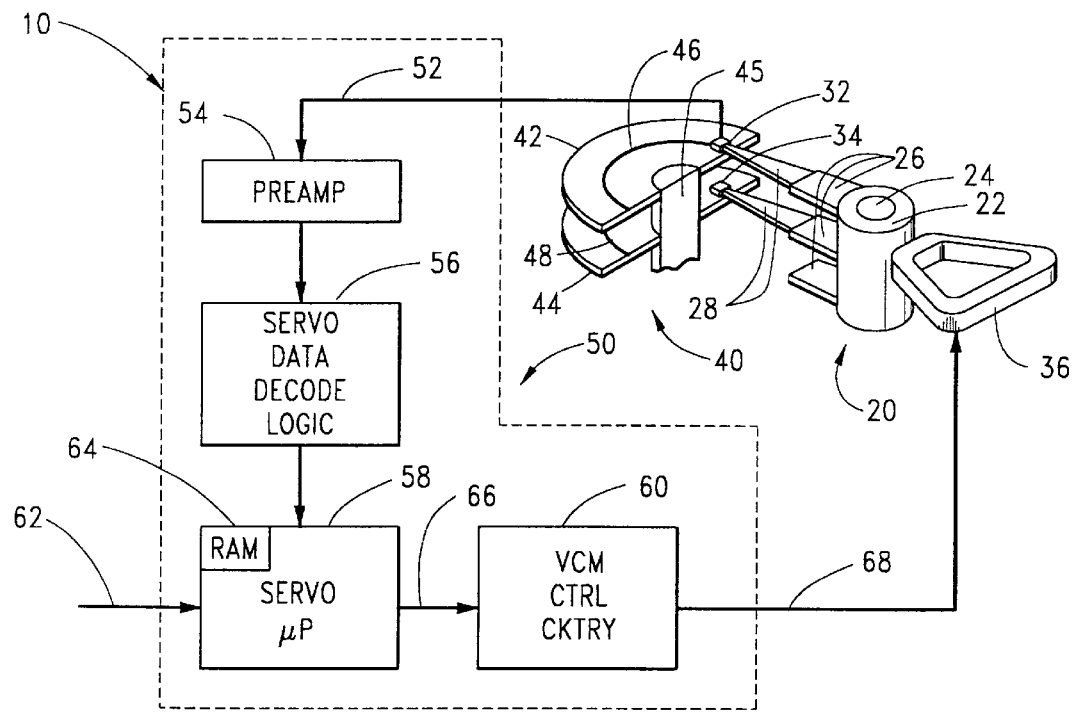
FIG. 1 is a functional block representation of a servo system for a disc drive of the present invention.

Turning now to the drawings and more particularly to FIG. 1, shown therein is a functional block representation of a servo system for a disc drive (generally denoted as 10) of the present invention. More particularly, FIG. 1 shows the disc drive 10 to include an actuator assembly 20, a disc stack 40 and a servo loop 50, with the servo loop 50 operably controlling the radial position of the actuator assembly 20 with respect to the disc stack 40.

The actuator assembly 20 comprises an actuator body 22 that pivots about a pivot shaft 24. The actuator body 22 includes arms 26 that extend radially as shown from the actuator body 22, and flexures 28 extend from each of the arms 26. Mounted at the distal end of each of the flexures 28 is a head (two shown in FIG. 1 at 32 and 34, respectively). Additionally, an actuator coil 36 is mounted to the actuator body 22 opposite the arms 26. The coil 36 is part of a conventional voice coil motor (VCM) comprising the coil 36 as well as a pair of permanent magnets (not shown) located above and below the coil 36, so that the coil 36 moves through the magnetic field established by these magnets as the actuator body 22 pivots about the pivot shaft 24.

The disc stack 40 comprises a plurality of discs (two shown in FIG. 1 as 42 and 44, respectively) mounted to a shaft 45 for rotation at a constant high speed by a conventional spindle motor (not shown). The surfaces of the discs 42 and 44 comprise a plurality of radially concentric tracks (two shown at 46 and 48, respectively).

It will be recognized that in a typical disc drive there will be one head per disc surface, but for purposes of clarity only two heads 32 and 34 have been shown in FIG. 1 corresponding to the top surfaces of the discs 42 and 44. It will further be recognized that servo information will be prerecorded on at least one of the surfaces of the discs 42, 44 to provide the requisite servo positioning information to the servo loop 50. As provided hereinabove, in a dedicated servo system one surface of one disc is designated as a dedicated servo surface (such as the top surface of the disc 42) so that servo information is prerecorded on all of the tracks (including track 46) and user data is stored on the remaining disc surfaces (such as on track 48 of the disc 44). In such a case the head 32 would be a servo head and the head 34 would be a data head. Alternatively, in an embedded servo system, the servo information is intermittently prerecorded on all of the tracks, so that each of the tracks 46 and 48 would contain both servo information and user data and the heads 32 and 34 would operate as both a servo and a data head. The present invention is not dependent upon the type of servo system implemented; however, in the preferred embodiment an embedded servo system is used and for purposes of illustration track 46 is contemplated as including such embedded servo information which is read by the head 32 and provided to the servo loop 50.

The servo loop 50 receives the servo information from the head 32 on signal path 52 and this servo information is amplified by a preamp circuit 54 and provided to a servo data decode logic circuitry 56. The servo data decode logic circuitry 56 includes an analog to digital converter (ADC) so that selected digital representations of the servo information are provided to a servo microprocessor 58 (which is preferably a digital signal processor). The servo microprocessor 58 generates the aforementioned PES from the servo information and uses the PES to generate and output a correction signal to a VCM control circuitry 60. The servo microprocessor 58 determines the correction signal in accordance with commands received by a disc drive system microprocessor (not shown) by way of signal path 62 and programming steps stored in a servo RAM 64. The correction signal is provided by way of signal path 66 to the VCM control circuitry 60, which includes a power amplifier (not shown) that outputs a controlled dc current of a selected magnitude and polarity to the coil 36 by way of signal path 68 in response to the correction signal. Thus, during track following mode, the servo information indicates the relative position error of the head 32 with respect to the center of the track 46 and the correction signal causes a correction in the dc current applied to the coil 36 in order to compensate for this position error and move the head 32 to the center of the track 46 (or another position relative to the track 46, as desired). For additional discussion concerning the general construction and operation of the servo loop 50, see the previously incorporated Duffy et al. reference, U.S. Pat. No. 5,262,907 as well as U.S. Pat. No. 5,136,439 entitled SERVO POSITION DEMODULATION SYSTEM, issued Aug. 4, 1992 to Weispfenning et al., assigned to the assignee of the present invention and incorporated herein by reference. Moreover, it will be understood that new, additional programming in accordance with the present invention is stored in the RAM 64 and used by the servo microprocessor 58 in controlling the operation of the servo loop 50 as discussed in greater detail below.

Figure 2:
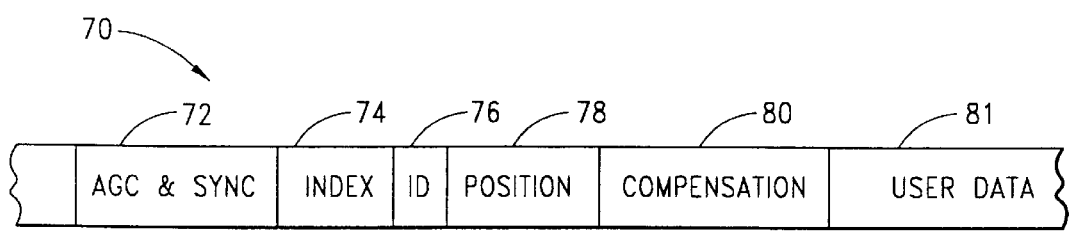
FIG. 2 provides a representation of the general format of a servo frame of the disc drive of FIG. 1.

As will be recognized, the servo information on the discs 42, 44 is recorded during the manufacturing of the disc drive 10 using a highly precise servo writer. The servo information defines the boundaries and centerlines of each of the tracks and is divided circumferentially into a number of frames, with user data interleaved between adjacent frames. The general format of one such frame 70 is shown in FIG. 2. More particularly, FIG. 2 shows the frame 70 to comprise a plurality of conventional fields, including an AGC & Sync field 72, an index field 74, a track ID field 76 and a position field 78. The AGC & Sync field 72 facilitates the generation of timing signals used by the disc drive 10, the index field 74 indicates radial position of the track, the track ID field 76 provides the track address (number) and the position field 78 provides an indication of the position of the associated head with respect to the frame 70. Of course, additional fields may be used as desired and the format of the fields in a servo frame will depend upon the construction of a particular disc drive; for more detailed discussion of typical servo fields see the previously incorporated Duffy et al. U.S. Pat. No. 5,262,907 and Weispfenning et al. U.S. Pat. No. 5,136,439 references.

As shown in FIG. 2, the frame 70 further includes a compensation field 80 which is used in the practice of the present invention. As discussed in greater detail below, compensation data (in the form of a compensation term) is written to the compensation field 80 and thereafter used in conjunction with the position field 78 to control the position of the head and eliminate the effects of error in the physical location of the frame 70. Although the compensation field 80 is shown to be located just after the position field 78 and just before the beginning of a user data portion 81 of the selected track of FIG. 2, it will be understood that the compensation field 80 can be located elsewhere in the frame 70, such as immediately before the position field 78.

Before continuing with a discussion of the configuration and the use of the compensation field 80, it will be helpful to first briefly discuss the position field 78, which in the preferred embodiment comprises four position burst fields arranged in an offset, quadrature pattern for a plurality of adjacent tracks, as shown more fully in FIG. 3. More particularly, FIG. 3 shows the position field 78 to comprise burst patterns A, B, C and D having selected geometries and magnetization vectors, defining a plurality of track boundaries identified as 0–5. Thus, each track comprises the area bounded by two adjacent track boundaries (e.g., the track 46 of FIG. 1 is represented in FIG. 3 to be bounded by the track boundaries 0 and 1). Additionally, the head 32 of FIG. 1 is represented in FIG. 3 as being centered on the track 46. The direction of rotation of the disc stack 40 (and hence the position field 78) relative to the head 32 is shown by an arrow 82. It will be recognized that other patterns besides the quadrature pattern of FIG. 3 can be readily employed in the practice of the present invention.

Both the A and B burst patterns are shown to extend from the center of one track to the center of an immediately adjacent track, with these patterns offset in a checkerboard fashion. Additionally, the C and D burst patterns extend from one track boundary to the next track boundary, with these patterns also offset as shown. Thus, as the head 32 passes over the position field 78 on track 46, the head will pass over portions of the A and B burst patterns (identified as 84 and 86, respectively) and then over the C burst pattern 88. However, the head 32 will not encounter the D burst pattern 90, as this pattern is on an adjacent track. For reference, tracks having C burst patterns are referred to as "even tracks" and tracks with D burst patterns are referred to as "odd tracks".

Generally, it will be recognized that when the head 32 is centered on the mid-point of track 46, the amplitude of an A burst signal induced in the head 32 by the A burst pattern 84 will be equal to the amplitude of a B burst signal induced in the head by the B burst pattern 86. Moreover, the amplitude of a C burst signal induced by the C burst pattern 88 will have a maximum value and the amplitude of a D burst signal from the D burst pattern 90 will be nominally zero. Further, when the head 32 is positioned over the track boundary 1, the amplitudes of the C and D burst signals from the patterns 88 and 90 will be equal in magnitude, the B burst signal from the pattern 86 will have a maximum value and the A burst from the pattern 84 will be zero. Thus, as the head 32 is swept from one track boundary to the next, the amplitudes of the A, B, C and D burst signals cycle between zero and maximum values and these amplitudes are used to generate the PES indicating the position of the head 32 with respect to the center of the track 46.

As discussed above, the servo frames 70 written during the servo track write operation will typically not be perfectly radially aligned so as to define a set of ideal circles for the tracks, but rather will be displaced somewhat about an ideal centerline for each track, and may further be different for each track. Such radial displacement, or error, will generally result from bearing tolerances, out of balance discs, mechanical resonances and tolerances of the servo track writer, and other factors which affect the precise location of the frames 70 during the servo write process. Whereas such errors in the past have generally had a negligible effect upon the operation of the servo loop 50, as track densities increase, accounting for these errors consumes an increasingly greater amount of the allotted track misregistration budget and ultimately operates as an upper limit on the densities of tracks that can be achieved in a particular drive design. Such errors can be sinusoidal in nature at a frequency related to the rotational speed of the motor, but can also comprise non-sinusoidal, random errors, such as illustrated in FIG. 4.

FIG. 4 provides a representation of the track 46 which is contemplated as having the type of random errors discussed above. For clarity, the ideal centerline for the track 46 has been represented as a straight line, although it will be recognized that physically, all points on this centerline would be equidistant from the center of the disc. Moreover, successive servo frames have been represented in FIG. 4 at 70A–70K. For reference, a typical embedded servo track will have a total of from about 30 to 90 frames, with user data interleaved between adjacent frames as indicated in FIG. 4. Thus, the first eleven servo frames 70A–70K are represented in FIG. 4, with frame 70A coinciding with the index (that is, the beginning reference for the track 46). Further, it will be recognized that the aspect ratio (width to length) for the track 46 has been exaggerated for purposes of facilitating the present discussion.

In a typical disc drive constructed in accordance with the prior art, during a track following mode the associated head will read each successive frame 70A–70K and the disc drive servo loop will attempt to maintain the head over the midpoints of the frames 70A–70K (i.e., follow the dotted path 94). As will be recognized, the addition of a sinusoidal correction signal to the PES as taught in the prior art might provide some amount of compensation, but would not significantly reduce the effects of such placement errors as shown in FIG. 4 based upon the non-sinusoidal nature of the errors. The present invention, however, provides a methodology whereby the types of errors shown in FIG. 4 can be readily compensated so that a head will nominally follow the ideal centerline shown in FIG. 4, regardless of the error associated with the frames 70.

Figure 5:
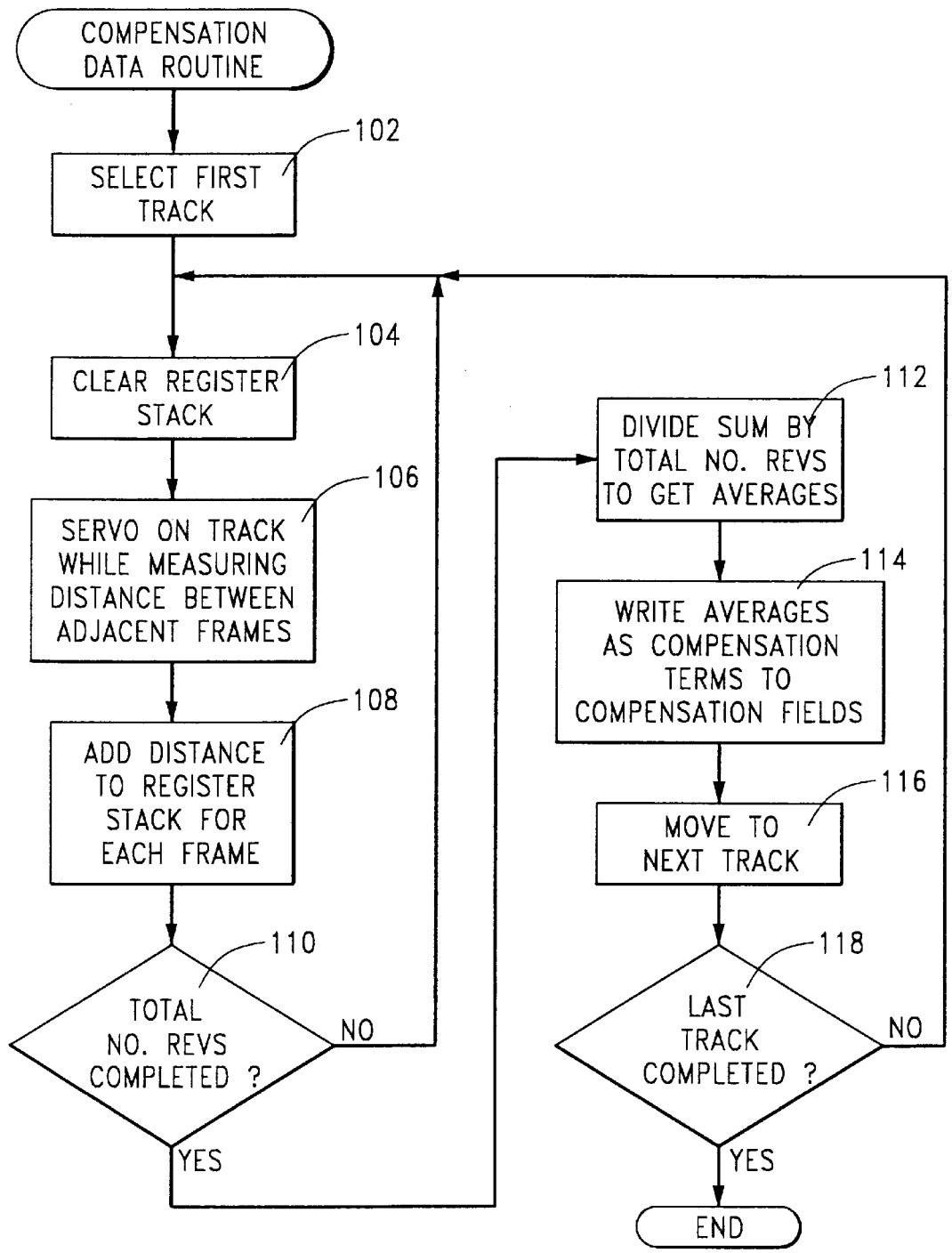
FIG. 5 shows a register stack used in the practice of the present invention.

Turning now to FIG. 5, shown therein is a representation of a register stack 100 used in the practice of the present invention. The stack 100 can be provided from selected locations of a separate discrete memory device of the disc drive 10 or can be provided using a portion of existing memory, such as the RAM 64 of FIG. 1. The stack 100 is organized so that a unique register is provided for each of the n frames 70 in a selected track of the disc drive 10. The stack 100 is used to characterize the error associated with each frame 70 of the selected track by accumulating and storing the average difference between the midpoint of each frame and the immediately successive frame; for example, for frame 70A (also referred to as "frame 1"), the average difference between the midpoints of frames 70A and 70B is accumulated and stored in the first register, and so on. This will be discussed in more detail below with reference to FIG. 6.

FIG. 6 provides a generalized flow chart for a COMPENSATION DATA routine, illustrating the steps performed to characterize the error illustrated in FIG. 4. The routine of FIG. 6 is preferably performed during manufacturing of the disc drive 10 after the servo writing operation is completed.

The routine begins by selecting the first track to be characterized, as shown by block 102. As will be recognized, in a disc drive employing an embedded servo system all of the tracks include servo information; hence, each of the tracks on each of the discs will in turn be selected by the routine. Once the first track is selected, the stack 100 is cleared, as indicated by block 104 and at block 106, the disc drive 10 is instructed to servo on track, following the selected track and measuring the radial distance between adjacent frames. For example, when the head (32 in the present example) reaches the frame 70B, the radial distance (with respect to the center of the disc) between the centerpoints of frames 70A and 70B is determined and temporarily stored in the stack 100 for frame 70A (frame 1). Such information can be readily obtained from the PES and the corrections necessary to maintain the head 32 over the path 94. This process is continued for each successive pair of frames 70 over a plurality of revolutions of the disc 42, with each new radial distance measurement for each frame being added to the existing value in the corresponding register of the stack 100, as indicated by block 108.

Once the selected number of revolutions has been completed (which preferably is at least five), as indicated by decision block 110 the flow of FIG. 6 continues to block 112 wherein the sums in the stack 100 are divided by the total number of revolutions in order to obtain the average distance for each frame 70, as shown in FIG. 5. Thereafter, the head 32 writes the average distance as a compensation term to each corresponding compensation field 80 for each frame 70, as shown by block 114. As the average distance can be either a positive or negative value, the compensation terms are preferably written in a digital, two's complement form (with attendant run-length limited and error correction encoding, as necessary). Once all of the compensation terms have been written to the n frames 70 of the selected track, the next track is selected (block 116) and the routine is repeated for this next track. The routine is continued until every track having servo information has had compensation terms determined and stored, after which the routine ends (as determined by decision block 118).

Having determined and stored the compensation terms, the disc drive 10 subsequently utilizes the compensation terms during normal operation to eliminate the servo error, as discussed with reference to FIG. 7. Shown therein is a block diagram of a portion of the servo loop 50 which generates the appropriate correction signals to control the position of the head 32. Particularly, a measured PES (block 120) is generated in a conventional manner from the position fields 78 of the frames 70 of a selected track and then summed at a junction 122 with a sum of the compensation terms that have been received since the most recent index (block 124) of the selected track. That is, the servo microprocessor 58 maintains a running sum of the compensation terms for each revolution of the selected track, beginning at the index (frame 70A of FIG. 4). The output sum (modified PES) is provided on signal path 126 to an estimator 128, which outputs correction signals to a power amplifier 130 on a signal path 132; it will be understood that the power amplifier 130 is part of the VCM control circuitry 60 of FIG. 1. The estimator 128 also receives the actual compensation term for each frame 70 from block 134 (using path 136) and the estimator 128 further receives a desired position command from block 138 (using path 140). The desired position command indicates the desired position of the head with respect to the track, whether over the center or with a selected amount of offtrack bias (for example, +6% offtrack).

Generally, the estimator 128 determines and outputs a sequence of correction signals to the power amplifier 130, including a number of correction signals that are based upon estimates of head position and velocity. The need for such estimation techniques arises from the fact that servo information is only intermittently available to the servo loop 50, but corrections to the position of the head 32 are required more frequently to maintain closed loop control. Thus, at times when the head 32 is over the user data portions of a selected track (such as 81 in FIG. 2), the estimator 128 provides estimates of the head parameters and generates correction signals accordingly. Such general estimation techniques are discussed in U.S. Pat. No. 4,679,103, issued Jul. 7, 1987 to Workman, incorporated herein by reference. The estimator 128 of the present invention, however, further takes into account the compensation data to generate correction signals which eliminate or greatly reduce the effects of the errors in the location of the servo frames.

The estimator 128 generates predicted values for head position (Xp) and head velocity (Vp) using the following well established relationships:

$$Xp = Xe + Ve + \tfrac{1}{2}IA \quad (1)$$

$$Vp = Ve + IA \quad (2)$$

with Xe being an estimated position of the head, Ve being an estimated velocity, I being the current to the coil 36 and A being a scaled acceleration factor representing the acceleration characteristics of the plant (mechanical acceleration/ amp of current). Moreover, the estimator 128 includes correction for bias forces upon the head caused by flexure and windage effects.

Referring now to FIG. 8, shown therein is a block diagram of the estimator 128 of FIG. 7, constructed in accordance with the preferred embodiment of the present invention. For reference, the three input signal paths 126 (modified PES), 136 (compensation term) and 140 (desired position command) from FIG. 7 are shown as inputs to the circuit of FIG. 8. The output signal path 132 (correction signal) of FIG. 7 is shown as the output of the estimator 128 in FIG. 8.

The modified PES on path 126 is summed at a summing junction 152 with a modified predicted position signal (generated as described below) on path 154 to generate an estimated position error signal on path 156. The estimated position error signal is provided to amplifiers 158, 160 and 162, which multiply the estimated position error signal by gains denoted as Lx (position gain), Lv (velocity gain) and Lw (bias gain). The outputs of the amplifiers 158, 160 and 162 are provided to summers 164, 166 and 168, respectively, which sum these outputs with additional signals to be described below.

The summer 164 generates an estimated position signal (path 170), the summer 166 generates an estimated velocity signal (path 172) and the summer 168 generates an estimated bias signal (path 174). The estimated bias signal is fed back to the summer 168 by way of a delay block 176, which operates at the sample rate of the servo loop 50 so that successive estimated bias signals are generated for each sample.

The estimated position signal on path 170 is provided to an amplifier 178 having gain Kx and the output signal is summed at a summing junction 180 with the desired position command signal on path 140 from the desired position block 138 (FIG. 7). Likewise, the estimated velocity signal on path 172 is amplified by an amplifier 182 having gain Kv. The outputs of the amplifier 182 and the summing junction 180 are summed by an error summer 184 and amplified by an error amplifier 186 with gain Ketf to generate a preliminary error signal on path 188. The preliminary error signal is passed through a conventional saturation block 190, the block 190 comprising a linear amplifier having saturation limits to match the VCM's saturation characteristics, and the output therefrom is summed with the estimated bias signal from path 174 at a summing junction 192 to generate the correction signal on path 132 for the power amplifier 130 (FIG. 7).

The preliminary error signal of path 188, which is indicative of the amount of current I to be passed through the coil 36, is also directed to a pair of amplifiers 194, 196, which have gains of Kpt and ½Kpt with Kpt corresponding to the acceleration scale factor A discussed above. Thus, the output of the amplifier 194 (on path 198) represents the term AI from equation (2) and corresponds to a predicted velocity change of the head 32. This output is summed with the estimated velocity signal Ve from path 172 by a summing block 202 to generate a predicted velocity signal Vp on path 204. Delay block 206 provides the requisite delay of this signal (at the sampling rate of the plant) so that a delayed predicted velocity signal is provided as an input to the summer 166.

In a similar fashion, the output of the amplifier 196 (on path 200) represents the term ½AI of equation (1) and corresponds to a predicted position change of the head 32. This output is summed with the estimated velocity signal Ve (path 172) and the estimated position signal Xe (path 170) by a summing block 208 to generate a predicted position signal Xp on path 210. However, the predicted position signal Xp is further summed at a summing junction 212 with the compensation term for the most recently read frame 70 (path 136) to provide a modified predicted position signal Xmp. The signal Xmp is delayed by a delay block 214 and provided to the summer 164, as well as to the summing junction 152 for summation with the input modified PES signal.

During operation, with reference to FIGS. 7 and 8, the PES is measured at block 120 from the position field 78 of a particular frame (for this example, frame 70C of FIG. 4) over which the head 32 passes. This measured PES is summed with the output from block 124, corresponding to the accumulated distance the servo frames 70 of the selected track since the most recent index are disposed from the ideal centerline for the track. That is, in the present example block 124 provides the sum of the compensation terms for the servo frames 70A, 70B and 70C. The sum of the measured PES and the output of block 124 comprises the modified PES on path 126.

The modified PES, adjusted further by the modified predicted position Xmp of path 154, alters the position, velocity and bias estimates of the summers 164, 166 and 168. The outputs of these summers are used to generate the first correction signal on path 132 after the most recently received frame 70C, as well as the subsequent correction signals generated at the sampling rate as the head 32 passes over the user data (81, FIG. 3) between the servo frames 70C and 70D. During this portion of the operation of the estimator 128, desired position command signals are input at the summing junction 180 and the correction term for the frame 70C is input to the summing junction 212. Such operation continues until the head reaches the next servo frame, 70D, and the above operation is repeated using the PES and compensation term for frame 70D.

As will be recognized, the present invention facilitates increases in track densities in disc drive designs by compensating for complex, non-sinusoidal and random errors in the location of the servo frames 70 in a disc drive (although the present invention will readily compensate for simple sinusoidal signal error components as well). The heads are caused to follow more perfectly concentric tracks about the drive, regardless of the actual position of the servo frames 70. Moreover, the servo loop 50 is generally more stable as fewer systematic corrections are performed by the servo loop 50 to account for the systematic variations in the locations of the frames 70, and fewer numbers of frames 70 are needed. Finally, the present invention requires little additional overhead and programming to implement, yet can significantly increase the capacity capabilities of a drive design and reduce the cost of the drive by requiring fewer discs and heads to achieve a selected storage capacity.

Although it is contemplated that in the preferred embodiment the compensation data is stored on the discs 42, 44 in compensation fields in each of the servo frames 70, the present invention is not so limited; that is, whereas the presently preferred approach is to record the compensation terms directly upon the disc media adjacent to the position fields 78, advances in the art or other design considerations may make it desirable to provide the compensation data elsewhere in the disc drive, whether on other tracks, in separate non-volatile digital memory or the like.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a rotatable disc, an actuator assembly adjacent the disc and a servo loop for controlling the relative position of a head of the actuator assembly with respect to a selected track on the disc through the generation of a position error signal from servo information stored on the track, the servo information arranged as a sequence of servo frames, each servo frame including at least one position field, each position field providing an indication of the position of the head relative to the track, a method of compensating for errors in the location of the servo information of the track, the method comprising:

measuring error in the location of the position field for each servo frame of the selected track, the error comprising a radial distance between the physical location of the position field and an ideal centerline for the track at a set radius on the disc;

providing a compensation field for each servo frame, each compensation field comprising a unique memory location associated with the corresponding servo frame;

generating a compensation term from the error in the location of each position field and storing the compensation term in the compensation field; and thereafter, during a track following mode of operation, measuring the actual radial position of the head from the position field of a selected servo frame;

summing the actual radial position with a sum of the compensation terms for each of the servo frames encountered since the most recent index to generate a modified position error signal;

using the modified position error signal and the compensation term for the selected servo frame to generate a correction signal; and outputting the correction signal to a power amplifier to control the position of the head.

2. The method of claim 1, wherein each of the compensation fields is disposed on the disc and incorporated as a portion of each of the corresponding servo frames.

3. The method of claim 1, wherein each compensation term is generated as the difference in the error in the location of successive position fields.

4. The method of claim 3, wherein the compensation terms are generated over a plurality of rotations of the disc.

5. In a disc drive having a disc with a plurality of nominally concentric tracks, an actuator assembly adjacent the disc and a servo loop for controlling the position of a head of the actuator assembly relative to a selected track, the servo loop generating a position error signal from servo information of the selected track, the servo information comprising a plurality of servo frames, each servo frame including a position field indicating the relative position of the head with respect to the servo frame, a method for correcting errors in the locations of the servo frames, comprising the steps of:

positioning the head over the selected track;

generating a compensation term for each of the servo frames of the selected track, comprising the steps of:
measuring the radial distance between each pair of successive servo frames; and
storing the average radial distances as the compensation terms, each average radial distance associated with a selected one of the servo frames of the selected track;

using the compensation terms and the position fields to generate correction signals; and outputting the correction signals to a power amplifier to adjust the position of the head.

6. The method of claim 5, wherein the step of using the compensation terms and the position fields to generate correction signals comprises the steps of:

measuring the actual radial position of the head from the position field of a selected servo frame;

summing the actual radial position with a sum of the compensation terms for each of the servo frames encountered since the most recent index to generate a modified position error signal; and using the modified position error signal to generate the correction signals.

7. The method of claim 5, wherein the compensation terms are stored in corresponding compensation fields, each compensation field comprising a unique memory location associated with each servo frame.

8. The method of claim 7, wherein each of the compensation fields is disposed on the disc and incorporated as a portion of each of the corresponding servo frames.

9. The method of claim 5, wherein the compensation terms are generated over a plurality of rotations of the disc.

10. In a disc drive of the type used to store user data on at least one rotating magnetic disc in the form of magnetic flux transitions, the disc drive having a positionably controllable actuator adjacent the disc and including a transducer for reading servo information stored on the disc in the form of a plurality of servo frames, the servo frames serving to define tracks on the disc and including a position field from which a position error signal is generated and used to control the position of the transducer through the application of current to a coil of the actuator, the coil immersed in a magnetic field of a voice coil motor, the position error signal indicative of the relative position of the head with respect to a selected track, the improvement comprising:

a plurality of compensation fields, each compensation field comprising a unique memory location corresponding to each of the servo frames, the compensation fields storing compensation terms, each compensation term indicative of radial error in the location of the position field with respect to the disc; and position means, responsive to the compensation terms, for positioning the head with respect to the selected track by:
generating a position error signal from the position fields of the servo frames associated with the selected track;
generating a modified position error signal by summing the position error signal with a sum of the compensation terms for the servo frames associated with the selected track; and
generating a correction signal from the modified position error signal, the correction signal controlling the amount of current applied to the coil of the actuator in order to position the head with respect to the selected track.

11. The improvement of claim 10, wherein the position means generates the correction signal from the modified position error signal by summing the modified position error signal with the correction term associated with a selected servo frame, the selected servo frame comprising the servo frame most proximate to the head.

12. The improvement of claim 10, further comprising compensation term generation means for generating the compensation terms, the compensation term generation means generating each compensation terms by measuring the radial error in the location of the associated position field, averaging the radial error over a plurality of rotations of the disc, and storing the average as the compensation term.

13. The improvement of claim 12, wherein the compensation fields are disposed on the disc and incorporated as part of the servo frames.

* * * * *

UNITED STATES PATENT AND TRADEMARK OFFICE
CERTIFICATE OF CORRECTION

PATENT NO. : 5,835,300
DATED : November 10, 1998
INVENTOR(S) : Robert Dale Murphy, et. al.

It is certified that error appears in the above-identified patent and that said Letters Patent is hereby corrected as shown below:

Column 2, line 1, delete "files" and insert --frames--;

Column 2, line 46, insert --the-- before "beginning"

Signed and Sealed this

Seventeenth Day of August, 1999

Attest:

Q. TODD DICKINSON

Attesting Officer

Acting Commissioner of Patents and Trademarks